United States Patent Office 3,594,421
Patented July 20, 1971

3,594,421
RECOVERY OF PRIMARY AMINES
James Edward Kmiecik, Austin, Tex., assignor to Jefferson Chemical Company, Inc., Houston, Tex.
No Drawing. Filed Oct. 31, 1968, Ser. No. 772,371
Int. Cl. C07c 85/06, 85/16
U.S. Cl. 260—583N                            6 Claims

ABSTRACT OF THE DISCLOSURE

Primary amines are recovered from the products of reductive amination of alcohols by converting the unreacted alcohols to alkyl borates and distilling the amines. Primary amines have many uses in commerce, for example, they are useful as corrosion inhibitors, ore flotation agents, germicides, rubber mold release agents, pigment coating agents and chemical intermediates.

BACKGROUND OF THE INVENTION

Field of the invention

The invention pertains to the recovery of amines synthesized by the reductive amination of alcohols.

Description of the prior art

The conversion of alcohols to borate esters is known. British Pats. 1,035,625; 1,035,626; 1,040,115 and 1,051,874.

SUMMARY OF THE INVENTION

My invention is a chemical process for separating amines from alcohols wherein the alcohols present are converted to alkyl borates by reacting the alcohols with boric acid, boric anhydride or borax, thereby rendering the alcohols much less volatile than the amines which allows a complete separation of the amines by distillation.

DESCRIPTION OF THE PREFERRED EMBODIMENTS

The separation of pure amines, especially primary amines, from the products of the reductive amination of pure alcohols is straight-forward and readily accomplished by distillation. However, the amination of an alcohol mixture of a simple carbon number of from 3 to 30 carbon atoms containing several isomers produces a mixture of isomeric amines and isomeric unreacted alcohols which cannot be separated by simple distillation because of the close boiling points of the amines and alcohols. My invention is a process wherein the unreacted alcohols in such mixtures are converted to trialkyl borates, thereby rendering the alcohols much less volatile than the amines. Thus the amines can be separated from the mixture in a pure state by distillation. After separation of the amines, the alcohols are regenerated by hydrolysis of the borate. The alcohols in an amine-alcohol mixture are converted to alkyl borates by reaction with boric anhydride, boric acid or borax, as follows:

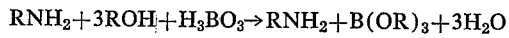

The water is removed as benzene azeotrope.

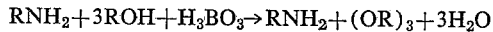

or

Subsequently, the amine is separated from the alkyl borates by distillation. After separation of the amine, the distillation bottoms can be hydrolyzed by boiling for about 15 minutes with water. The two phases are separated while hot. The upper phase contains the alcohol and the lower phase contains boric acid which may be recovered by crystallization.

A weak acid, for example ammonium chloride or sodium hydrogen sulfate may be used as a catalyst in my process if necessary.

The amine separation problem solved by my invention is also encountered in the reductive amination of oxo aldehydes containing quantities of the corresponding alcohols and my invention is applicable thereto.

EXAMPLE 1

A distillation fraction obtained from a $C_{11}$ aldehyde amination mixture had the following gas liquid chromatographic (GLC) area percent analysis

|  | GLC area, percent |
|---|---|
| Branched undecylamine | 34.5 |
| Normal undecylamine | 43.8 |
| Branched undecyl alcohol | 9.3 |
| Normal undecyl alcohol | 11.8 |
| Others | 0.6 |

To illustrate the use of boric anhydride in my invention, a 500 ml. flask equipped with a thermometer, a Dean-Stark water trap and a condenser mounted by a calcium chloride-filled drying tube was charged with 100 g. of the above-described mixture (equivalent to 21.1 g. or 0.123 mol of undecyl alcohol), 2 g. (0.028 mol) boric anhydride and 100 ml. benzene. The mixture was heated to gentle reflux where it became homogeneous and and water began to collect in the trap. After refluxing for two hours, 2 mls. of water had collected in the trap and no more appeared to be collecting. The reaction flask was fitted with a distilling column and after removing benzene by slowly reducing the system pressure from atmospheric to about 20 mm., 57 grams of material was taken overhead. This fraction had the following analysis:

|  | GLC area, percent |
|---|---|
| Branched undecylamine | 48.7 |
| Normal undecylamine | 50.3 |
| Normal undecyl alcohol | <0.1 |
| Others | 1.0 |

Thus, treatment with boric anhydride allowed undecylamine of 78% purity to be upgraded to 99% purity. Hydrolysis of the distillation residue regenerated alcohol from the trialkyl borate.

When boric anhydride is used in my process water is also present which causes the formation of boric acid. Thus, when boric anhdyride was used in my process, it was surprising that the boric acid present did not react with the amine present to form amine salts.

EXAMPLE 2

A distillation fraction obtained from a $C_{15}$ aldehyde amination product mixture had the following gas liquid chromatography (GLC) area percent analysis (br= branched, n=normal):

|  | GLC area, percent |
|---|---|
| Lights | 0.08 |
| Unknown | 1.87 |
| br-Pentadecylamines | 2.22 |
| n-Pentadecylamine | 55.71 |
| br-Pentadecyl alcohols | 17.53 |
| n-Pentadecyl alcohol | 18.27 |
| Others | 4.32 |

To further illustrate the use of boric anhydride in my invention, a solution of 95.8 g. of the above-described material in 200 ml. of toluene was prepared and 2.3 g. of boric anhydride was added. (95.8 g. of material is equivalent to about 0.07 mol of pentadecyl alcohol.) The theoretical amount of boric anhydride necessary to convert this alcohol to borate ester is about 0.01 mol since one mol of anhydride reacts with six mols of alcohol. Therefore, the amount of boric anhydride used (0.03 mol) was three times the required amount. The toluene solution was refluxed as described in Example 1, supra. The amount of water collected in the attached Dean-Stark trap was constant after two hours. After stripping off the toluene by gradually lowering the pressure from atmospheric to 10 mm., the residue was distilled through a Vigreux column operated at 5 mm. to give 37.2 g. of pentadecylamines, B.P. 135–144° C., 99.2 area percent pure by GLC. The final pot temperature in this distillation was 200° C. (5 mm.) and separation of pentadecylamines from pentadecyl alcohols would have been impossible if the alcohols had not been in the form of borate esters. Again, it was surprising that the boric acid present did not react with the amine present to form an amine salt.

EXAMPLE 3

A 793 g. fraction obtained from a $C_{17}$ aldehyde amination product mixture had the following GLC area percent analysis:

| | GLC area, percent |
|---|---|
| Lights | 0.04 |
| Unknown | 0.11 |
| br- and n-Heptadecylamines | 77.06 |
| br-Heptadecyl alcohol | 13.66 |
| n-Heptadecyl alcohol | 9.14 |

The total amount of heptadecyl alcohol in the mixture above was 181 g. which required 14.5 g. boric acid to convert the alcohol to a borate. To illustrate the use of boric acid in my invention, a mixture of 793 g. of the above-described material, 200 ml. toluene and 14.5 g. boric acid was charged to a 2-liter flask. The flask was fitted with a thermometer, a Dean-Stark water trap and a reflux condenser mounted by a calcium chloride-filled drying tube. After refluxing the mixture for 1.5 hours at 122° C. and collecting 9 ml. of water in the trap, the mixture was allowed to cool to about 70° C. Toluene was stripped off through a ¾-inch x 8-inch vacuum-jacketed Vigreux column by gradually lowering the pressure to 5 mm. Then using the same column, 658.4 g. of distillate (boiling point 164–181° C./5 mm.) was collected. This material analyzed as follows:

| | GLC area, percent |
|---|---|
| Unknown | 0.1 |
| br-Heptadecylamines | 87.6 |
| n-Heptadecylamine | 11.6 |
| Heptadecyl alcohols | Trace |

Wet chemical analysis of the distillate showed it to be 100% heptadecylamine. The extremely pure heptadecylamine of this example could not have been obtained without the boric acid treatment. It was surprising that the boric acid did not react with the amine present to form an amine salt.

Comparable results to those in the examples, supra, are obtained using processes within the scope of my invention which are not illustrated.

The reaction temperature for my process during the formation of the trialkyl borate is the temperature necessary to boil out the hydrocarbon-water azeotrope. The molar ratio for boric anhydride/alcohol in my process is $B_2O_3$/ROH 1.0/1.0 to 1.0/6.0, preferably 1.1/6.0. The molar ratio for boric acid/alcohol is $H_3BO_3$/ROH 1.0/1.0 to 1.0/3.0, preferably 1.1/3.0. My invention is applicable to alcohols containing from 3 to 30 carbon atoms.

I claim:
1. A process for separating amines from alcohols, the amines being prepared by the reductive amination of an isomeric alcohol mixture, the alcohols of the mixture having a single carbon number of 3 to 30 which comprises
    reacting the unreacted alcohols in the aminated mixture with boric acid, boric anhydride or borax by heating the aminated mixture with boric acid, boric anhydride or borax to reflux and
    distilling the amines from the mixture containing alkyl borates.
2. A process as in claim 1 wherein the molar ratio of boric anhydride to alcohol is within the range of from about 1.0/1.0 to about 1.0/6.0 and the molar ratio of boric acid to alcohol is within the range of from about 1.0/1.0 to about 1.0/3.0.
3. A process as in claim 2 wherein undecylamines are the reductive amination products.
4. A process as in claim 2 wherein pentadecylamines are the reductive amination products.
5. A process as in claim 2 wherein the alcohols are converted to alkyl borates by adding boric anhydride to the reductive amination products.
6. A process as in claim 2 wherein the alcohols are converted to alkyl borates by adding boric acid to the reductive amination products.

References Cited

Steinberg, Organoboron Chemistry, vol. 1, Interscience Publishers, New York (1964) p. 118.

CHARLES B. PARKER, Primary Examiner

R. L. RAYMOND, Assistant Examiner

U.S. Cl. X.R.

260—462R, 582, 585B

UNITED STATES PATENT OFFICE

CERTIFICATE OF CORRECTION

Patent No. 3,594,421                  Dated July 20, 1971

James Edward Kmiecik
Assignor to Jefferson Chemical Company, Inc.
Houston, Texas, a corporation of Delaware It is certified that errors appear in the above-identified patent and that Letters Patent are hereby corrected as shown below:

In column 1, line 59, the formula should read:

$$RNH_2 + 6ROH + B_2O_3 \longrightarrow RNH_2 + 2B(OR)_3 + 3H_2O;$$

in column 1, line 62, that portion of the formula reading "(OR)$_3$" should read -- B(OR)$_3$ --. Column 2, line 29, omit "and" (second occurrence).

Signed and sealed this 22nd day of February 1972.

(SEAL)
Attest:

EDWARD M. FLETCHER, JR.        ROBERT GOTTSCHALK
Attesting Officer                Commissioner of Patents